United States Patent Office 3,529,126
Patented Sept. 15, 1970

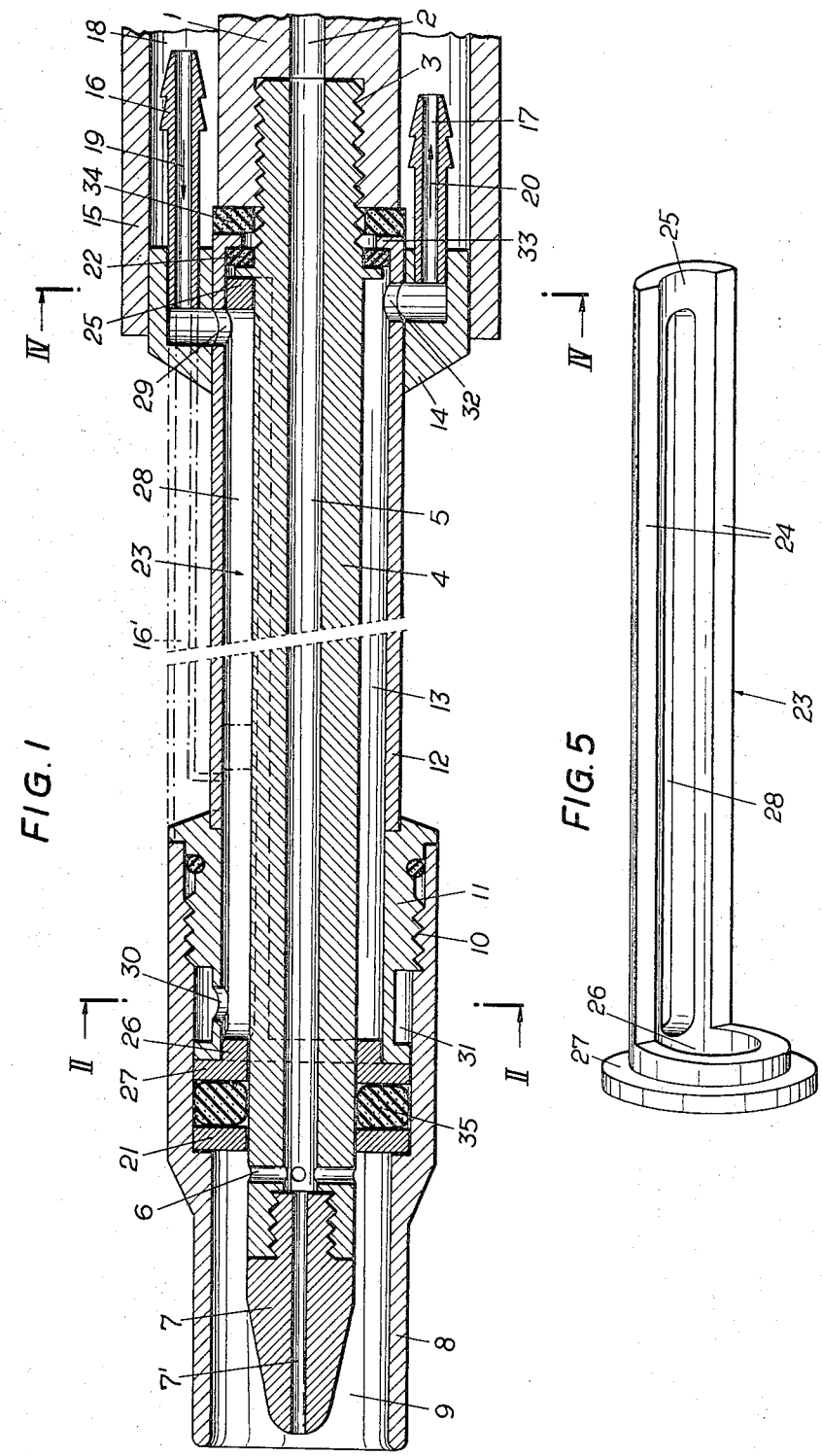

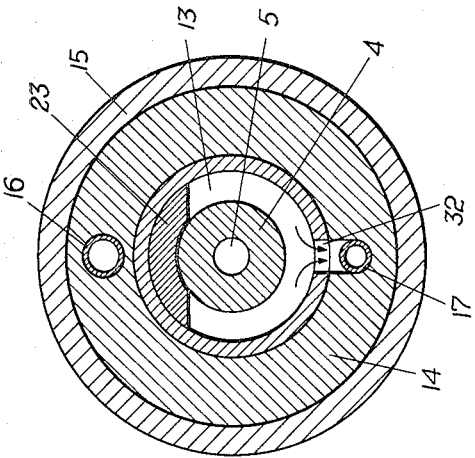
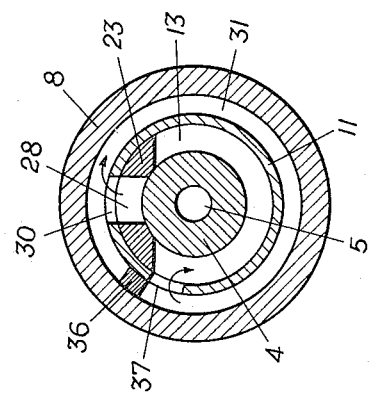
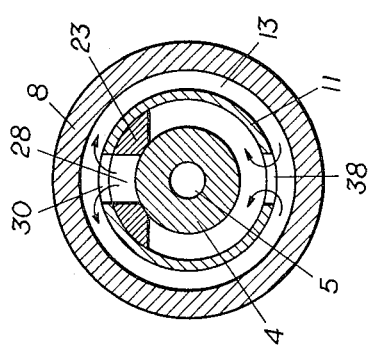

3,529,126
INERT GAS SHIELDED WELDING TORCH
Olaf Reeh, Adalbert-Stifter-Str. 1, Munich-
Unterpfaffenhofen, Germany
Filed Mar. 25, 1968, Ser. No. 715,908
Claims priority, application Austria, Apr. 4, 1967,
A 3,234/67
Int. Cl. B23k 9/26
U.S. Cl. 219—130
4 Claims

ABSTRACT OF THE DISCLOSURE

The welding head of an inert gas shielded welding torch is cooled by a coolant which is circulated through an annular space between an outer burner tube and a coaxially disposed inner contact tube and at least one conducting element is disposed in this annular space and defines axially parallel canals in which the coolant circulates in opposite directions.

---

The present invention relates to a gas shielded welding torch whose welding head is cooled by a liquid coolant circulating in opposite directions along a conducting element disposed in an annular space formed between an inner contact tube and a spaced outer burner tube. It is known to cool inert gas shielded welding torches by means of a coolant, particularly water, in order to remove the heat generated by resistance heating and arcing effects. In order to provide an effective cooling of the welding head this type of welding torch has a water inlet and outlet conduit outside the burner tube at the welding head or only an inlet conduit so that the water coolant is returned between the burner tube and the so-called contact tube to a hose connection mounted in the welder grip. In the first mentioned welder construction it has been found that primarily the gas nozzle is cooled while the contact tube is subjected to only slight cooling. In the other welder design the contact tube receives most of the cooling effect while the gas nozzle is cooled only indirectly. This provides a good cooling for the contact tube but the thermally highly exposed gas tube is cooled only indirectly and therefore not sufficiently, and the water coolant is not induced to follow a predetermined flow path.

In both constructions the conduits are subject to breakdown because of their exposed mounting outside of the burner tube and this affects the handling of the welder and its operating safety adversely.

In another type of known welder the conduits for the water coolant enter and leave through an appropriate opening in the burner tube already in the vicinity of the grip tube in order to avoid the mounting of exposed conduits up to the welder head. This solution presents the disadvantage that the cooling of the welder head takes place only through uncontrolled water streams or merely on the basis of a thermal siphon effect. The same as every cooling system without forced water circulation this system presents also the inherent danger of scale formation due to excessively high local water temperatures.

The prior art constructions require besides an outer electrical insulation of the grip of the burner tube and welder head also an electrically insulated gas nozzle because these parts conduct a welding voltage. These insulations produce of necessity a considerable and undesirable increase of the dimensions of the parts to be insulated, which renders the handling of the welder more difficult. The unavoidable failures of the insulation due to the rough welding operations together with the mechanical and thermal loads of the welder causes operating disturbances due to short circuits between the workpiece and the non-insulated welder parts.

It is therefore an object of the invention to avoid the aforementioned disadvantages in an inert gas shielded welding torch having a liquid cooled welder head in which the coolant enters and leaves the annular space between an outer burner tube and a coaxially disposed inner contact tube for feeding the welding wire, the inert gas and the electrical current to the torch nozzle, wherein the contact tube is maintained in a central position relative to the burner tube by electrically insulating and simultaneously fluid sealing spacer elements in that at least one conducting element is provided in the annular space and defines axially parallel canals in which the coolant is subjected to a forced flow in opposite directions.

According to a suitable embodiment of the welding torch of this invention the conducting element can have two legs extending parallel to the welder axis and connected at each end by a web member. The legs and web members have a thickness which corresponds to the radial distance between the burner tube and the contact tube so that a longitudinal slot is formed which presents a flow canal for the coolant. Furthermore the front part of the welder head has an annular canal which provides a communication of the space inside the longitudinal slot with the annular space remaining outside the contact element. The water coolant fed to the welder through a connection nipple arrives first in the space formed by the longitudinal slot in the conducting element and which represents a flow canal, enters at the forward end of the welder into the mentioned annular canal and continues in counter-current flow outside the conducting element, while flowing around the contact tube, to an outlet opening, leaving the welder through a discharge nipple.

It may be seen that the construction of the welder disclosed herein produces an exactly predetermined water circulation and thus an optimum cooling of the welder parts subjected to thermally high loads, especially of the contact tube, the contact nozzle and also the gas nozzle, which avoids the alloying of welding material spray particles, and also the friction coefficient of the contact nozzle cannot drop to an undesired degree which would create difficulties in feeding the welding wire.

The objects, features and advantages of the invention will become further apparent from the following description of an embodiment of the welding torch according to the invention in connection with the accompanying drawings in which:

FIG. 1 is a longitudinal section through the front part of the welder;
FIG. 2 is a section along line II—II of FIG. 1;
FIG. 3 shows a modification in respect to FIG. 1;
FIG. 4 is a section along line IV—IV of FIG. 1; and
FIG. 5 is a perspective view of the conductive member of the welder.

The drawings illustrate only the front part of the welding torch as this is sufficient to describe the present invention. With reference to FIG. 1 it will be seen that a connection piece 1 which has a longitudinal bore 2 for feeding the welding wire and the inert shielding gas is screwed onto the thread portion 3 of the contact tube 4 which has a bore 5 coaxial with bore 2 of the connection piece 1. The front part of the contact tube 4 has several cross-bores 6 through which the protective gas may escape for the purpose of flowing around the contact nozzle 7 which is screwed into the front end of the contact tube 4. The contact nozzle 7 has a narrow longitudinal bore 7' for feeding the welding wire which emerges from the contact nozzle 7 at the required speed as advanced by a suitable feeder device (not shown).

The contact nozzle, the contact tube and the connection piece which carry the welding voltage are concentrically surrounded by the welder parts described in greater detail hereafter.

The contact 7 is surrounded by a gas nozzle 8 which forms with the contact nozzle an annular space 9 which is filled with an inert shielding gas during the welding operation, and this gas escapes through the cross bores 6. The gas nozzle 8 has adjacent its inner end a threaded portion 10 on which the welder head 11 is screwed and which extends rearwardly in the form of a burner tube 12. The burner tube and the welder head are telescoped together and securely attached to each other. The welder head 11 and burner tube 12 on the one hand and the inner contact tube 4 on the other hand define an annular chamber 13 which is traversed by the coolant. The rear part of the burner tube 12 leads into an extension piece 14 on which the welder grip 15 of plastic material is mounted. The extension piece 14 carries two nipples 16, 17 which serve as inlet and outlet of the coolant and are located in the annular chamber 18 between the connection piece 1 and the welder grip 15. Hose connections (not shown) serve to bring in and discharge the coolant in the direction of the arrows 19, 20.

The contact tube 4 is maintained in a central position relative to the gas nozzle 8 or the welder head 11 and the burner tube 12 by means of spacer rings 21, 22 which have also an electrically insulating function. The forward ring 21 provides also the sealing of the annular chamber 13 for the coolant relative to the annular chamber 9 for the shielding gas. The rearward ring 22 seals the annular chamber 13 from the annular chamber 18 which contains the nipples 16, 17.

A conducting element 23 is inserted in the annular chamber 13 for the coolant and consists of two parallel legs 24 and two web portions 25, 26 which join the two legs. In the front part the conducting element is of tubular shape and a flange 27 serves similar to the sealing rings 21, 22 also for sealing and spacing the contact tube 4. By means of the legs 24 and the web portions 25, 26 a slot 28 is formed which is connected at the rearward extremity to a bore 29 and the nipple 16 for the water supply. The welder head 11 has a corresponding bore 30 which provides a connection through an annular chamber 31 between the gas nozzle 8 and the welder head 11. At the burner tube 12 a bore 32 is provided in the rearward area adjacent the connection piece and the coolant flows through this bore to the discharge nipple 17. The contact tube 4 has at its rearward extremity an inwardly extending flange 33 and the sealing rings 22 and 34 on either side of the flange are provided to assure a good seal between the annular chamber 13 and the annular chamber 18.

Between the flange 27 of the conducting element 23 and the front sealing ring 21 an O-ring 35 is disposed as supplemental sealing means.

The conducting element 23 defines two canals for the coolant which are sealed from each other and extend axially parallel. A canal is formed by the slot 28 in the conducting member and the coolant flows in this canal to the forward extremity of the welder. By means of bore 30 it flows thereafter into the outer annular chamber 31 and continues either in only one direction for about 270° around the welder head before it flows in front of a block 36 through a bore 37 and returns to the annular chamber 13 between the burner tube 12 and the contact tube 4, as shown in FIG. 2.

Another possibility for the coolant flow is shown in FIG. 3 in that the block 36 is removed so that the coolant flows around the welder head 11 in two opposite directions for 180° and returns through a bore 38 into the annular chamber 13. This part of the annular chamber 13 represents the canal in which the coolant is forced to flow again to the rearward extremity of the welder and via the aforementioned bore 32 to the discharge nipple 17. Accordingly the coolant is forced to follow a very specific flow path which assures an optimum heat removal. It is understood that one can vary the cross-section of the canals formed by the conducting element 23 in accordance with the particular requirements.

An electrical separation of the contact tube 4 from the outer welder parts 8, 11, 12 makes an outer electrical insulation of these parts unnecessary.

In order to avoid the difficulties of maintaining small tolerances with curved welder forms it may be in some instances appropriate to lead one of the water nipples 16, 17 up to the welder head 11 on the outside and along the burner tube so as to conform to its curved shape (16') and to introduce the coolant only at the welder head into the canal formed by the conducting element. This arrangement which is shown in FIG. 1 in dot and dash lines permits a short and straight form of the conducting element which can thus be manufactured and mounted in a substantially more simplified manner than if it had a long and curved shape, and in this case the coolant is also forced to take a specific predetermined flow path in order to assure the desired intensive cooling effect.

The construction of the welder according to the invention herein described presents finally also the advantage that the main parts of the welder, especially the contact tube 7 may be exchanged easily and rapidly. This merely requires unscrewing the gas nozzle 8 from the welder head 11 whereupon the contact tube 7 may be separated from the connection piece 1 whereby also the burner tube 12 together with the conducting element 23 may be removed. Prior art welder constructions had either well cooled contact tubes but they were soldered securely in the welder head, or their parts were exchangeable because they were only held in position by a clamping ring or the like, but in that case practically uncooled. With the construction according to the invention a welder has thus been developed whose main parts are not only sufficiently cooled but may also be rapidly and easily exchanged.

What is claimed is:

1. An inert gas shielded welding torch comprising in combination:
    a centrally located axially extending contact tube (4),
    a burner tube (12) surrounding said contact tube (4) and defining with said contact tube (4) an axially extending annular space (13),
    means (25, 26) defining end walls at each end of said annular space (13),
    a conducting element (23) mounted in said annular space (13) and extending coaxially therewith,
    said conducting element (23) comprising a pair of parallel legs (24), extending for the length of said space (13) and being spaced apart circumferentially to define therebetween a slot (28),
    orifice means (29) at one end of said burner tube (12) and communicating with said slot (28) for introducing a cooling medium into said slot,
    orifice means (30, 31) and channel means (37) at the other end of said slot (28) providing open communication between said slot (28) and said annular space (13) whereby said cooling medium is forced to flow from said slot (28) into said annular space (13) for cooling said contact tube (4), and orifice means (32) for removing said cooling medium from said annular space (13).

2. The structure of claim 1 wherein said conducting element (23) and said end walls (25, 26) form an integral assembly.

3. The structure of claim 2 further comprising spacer means (27) formed integrally with said end wall (26).

4. The structure of claim 1 wherein said legs (24) of said conducting element (23) are spaced apart circumferentially approximately 270°.

References Cited

UNITED STATES PATENTS

| 2,768,280 | 10/1956 | Renaudie | 219—130 |
| 3,397,298 | 8/1968 | Nelson | 219—75 |
| 3,398,231 | 8/1968 | Sullivan | 219—130 X |

JOSEPH V. TRUHE, Primary Examiner

J. G. SMITH, Assistant Examiner

U.S. Cl. X.R.

219—120